United States Patent
Piotrowski et al.

(10) Patent No.: US 11,274,702 B1
(45) Date of Patent: Mar. 15, 2022

(54) ROLLER BEARING ASSEMBLY

(71) Applicant: PRATT & WHITNEY CANADA CORP., Longueuil (CA)

(72) Inventors: Maciej Piotrowski, Rzeszow (PL); Jean-Jacques Forest, Entrevernes (FR)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/999,677

(22) Filed: Aug. 21, 2020

(51) Int. Cl.
| | |
|---|---|
| F16C 33/58 | (2006.01) |
| F16C 19/36 | (2006.01) |
| F16C 43/04 | (2006.01) |
| F16C 35/06 | (2006.01) |
| F16C 35/063 | (2006.01) |

(52) U.S. Cl.
CPC .......... F16C 33/586 (2013.01); F16C 19/361 (2013.01); F16C 35/063 (2013.01); F16C 43/04 (2013.01)

(58) Field of Classification Search
CPC .... F16C 19/361; F16C 33/586; F16C 35/045; F16C 35/063; F16C 35/067; F16C 43/04; F16C 43/06; F16C 2360/23; F01D 25/16; F01D 25/162
See application file for complete search history.

(56) References Cited

U.S. PATENT DOCUMENTS

| | | | | |
|---|---|---|---|---|
| 4,129,344 A | * | 12/1978 | Hormann | F16C 33/6677 384/467 |
| 9,541,185 B2 | | 1/2017 | Albrecht et al. | |
| 9,599,161 B2 | * | 3/2017 | Walker | F16C 19/06 |
| 10,047,796 B2 | | 8/2018 | Jinbo | |
| 2009/0322170 A1 | * | 12/2009 | Sone | F16C 33/80 310/90 |
| 2014/0003755 A1 | * | 1/2014 | Pausch | F16C 32/0442 384/512 |
| 2016/0238075 A1 | * | 8/2016 | Clark | F16F 15/0237 |
| 2018/0266429 A1 | | 9/2018 | MacFarlane et al. | |

* cited by examiner

*Primary Examiner* — Alan B Waits
(74) *Attorney, Agent, or Firm* — Norton Rose Fulbright Canada LLP

(57) ABSTRACT

An inner ring cooperates with an outer ring to form a roller bearing assembly. The inner ring comprises an outer circumferential surface receiving a plurality of roller bearing elements engageable with the outer ring upon forming of the roller bearing assembly. An inner circumferential surface of the inner ring is slideably mountable to a shaft upon forming of the roller bearing assembly and includes a base portion slideably engageable with a surface of the shaft upon mounting and at least one cutout portion opening to an outer edge of the inner circumferential surface. A clearance forms between a surface of the at least one cutout portion and the surface of the shaft upon mounting. Upon forming of the roller bearing assembly, the base portion of the circumferential surface is engageable with the shaft subsequently to the plurality of roller bearing elements engaging with the outer ring.

19 Claims, 5 Drawing Sheets

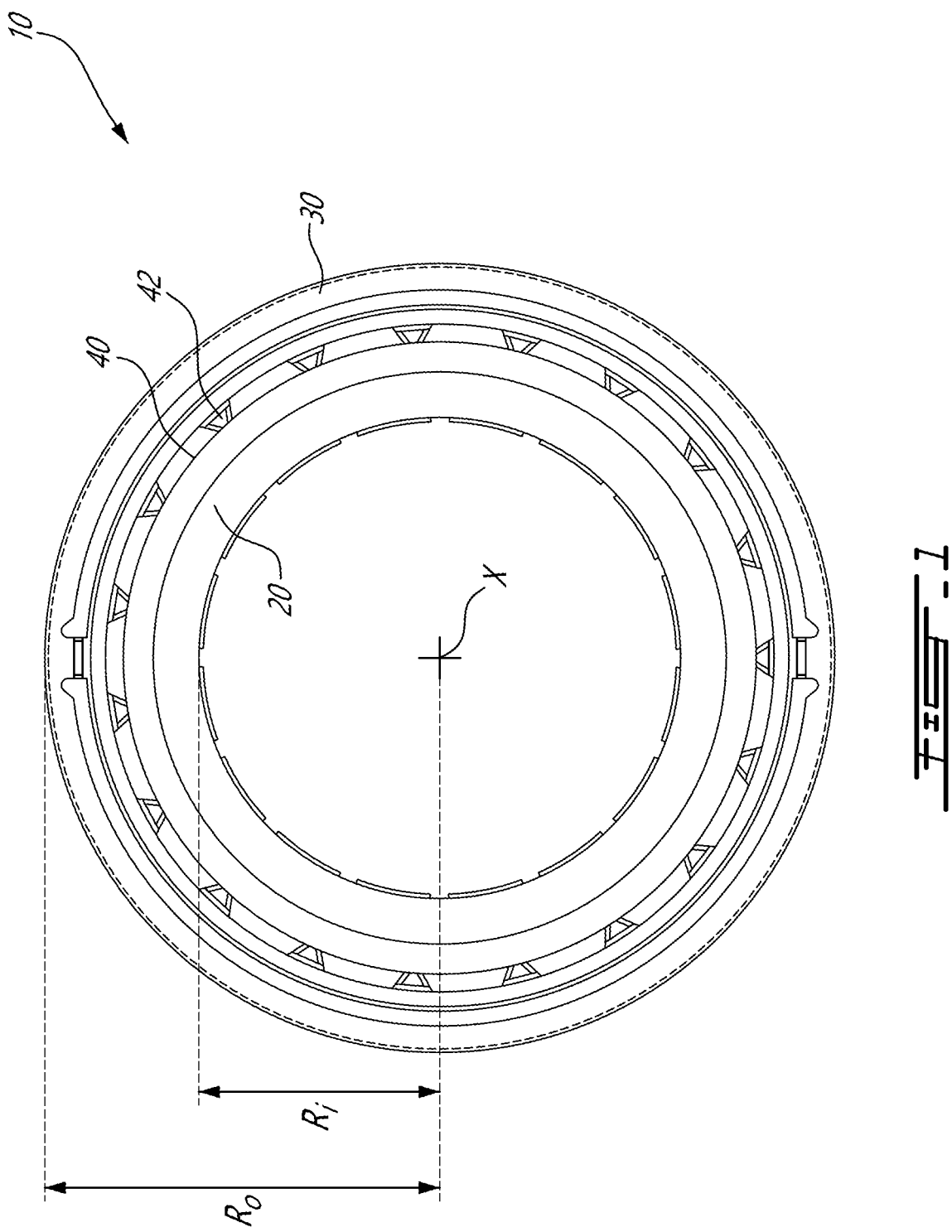

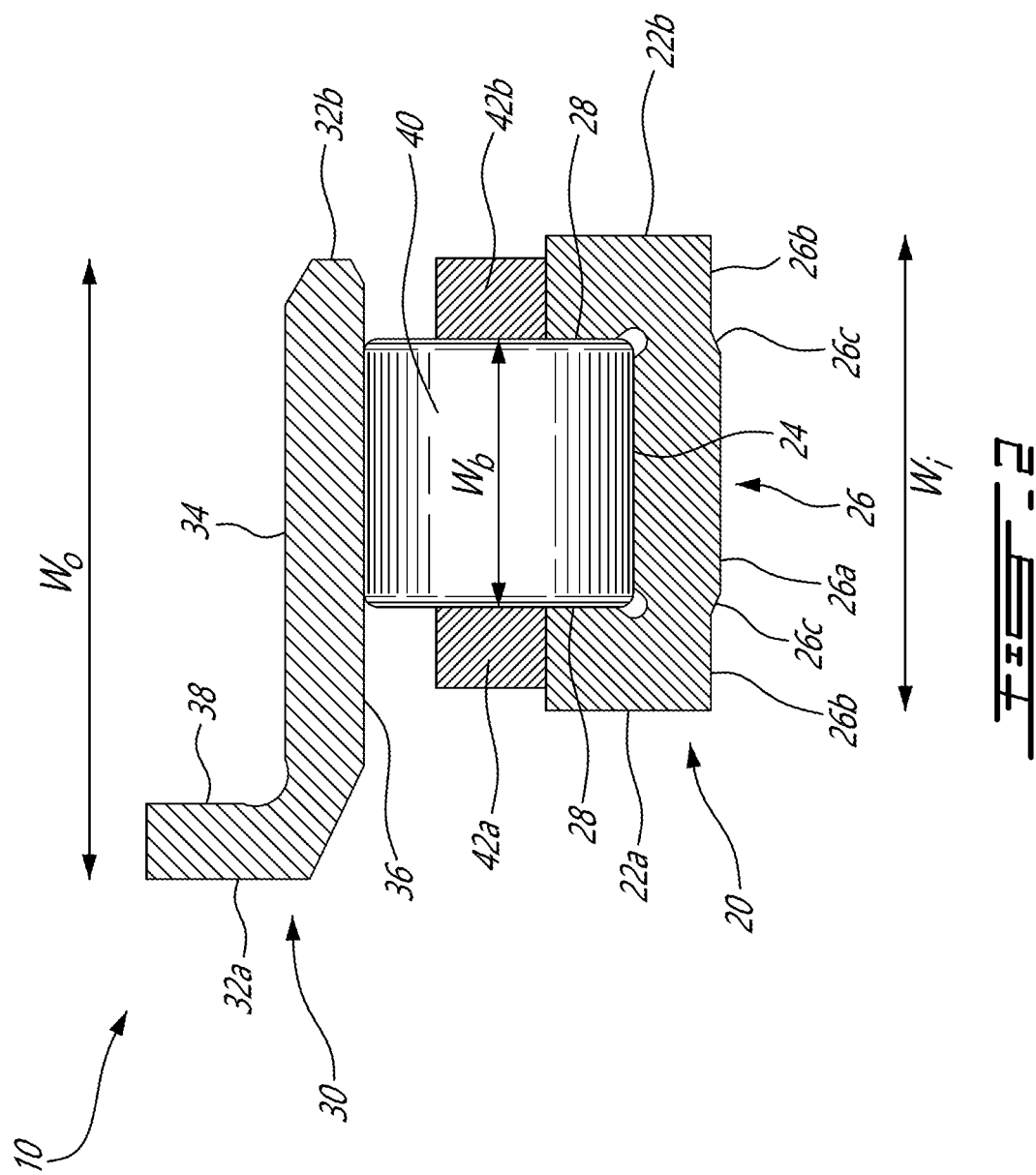

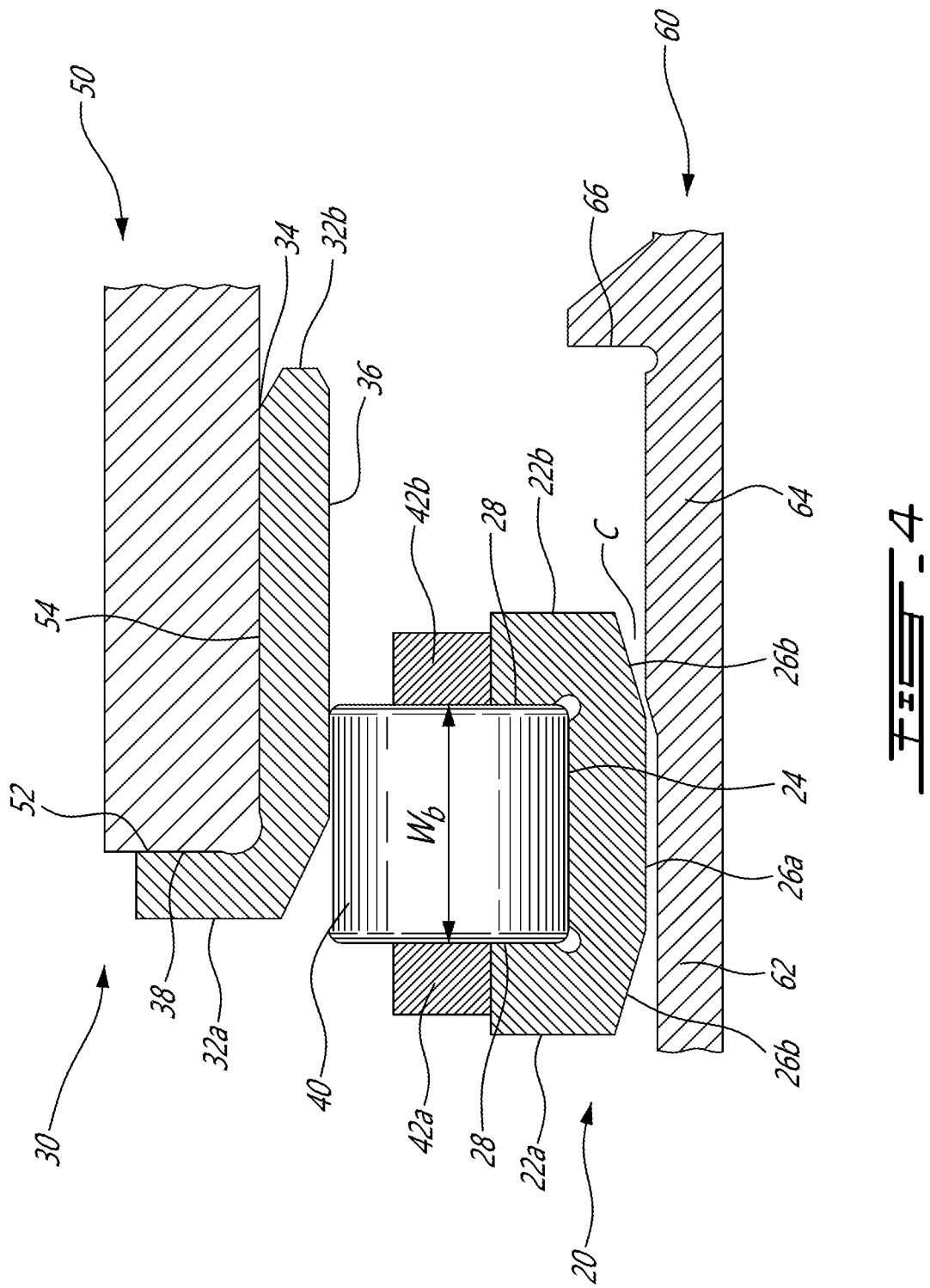

ROLLER BEARING ASSEMBLY

TECHNICAL FIELD

The application relates generally to roller bearing assemblies and, more particularly, to optimized geometries for such roller bearing assemblies.

BACKGROUND OF THE ART

Bearing assemblies, such as roller bearing assemblies for gas turbine engines, are often installed part-by-part in different steps. For instance, the outer ring may be first installed against a housing or other static component, then the inner ring, which holds the bearing elements, may be subsequently installed on a shaft proximate the housing. This process may lead to various risks of damage to the components. For instance, the tight fit between the inner ring and the shaft may reduce the bearing assembly's radial clearance, leading the bearing elements to be scratched as they engage the outer ring. Conversely, an inner circumferential surface of the inner ring race may be scratched as it engages the shaft.

To minimize such risks, traditional bearings may be designed to include relatively big lead-in chamfers and/or to maintain positive bearing integral radial clearance (IRC) during assembly. However, such measures may not be sufficient to prevent potential damage such as scratching of the bearing elements during the assembly process.

SUMMARY

In one aspect, there is provided a roller bearing assembly comprising an outer ring defining a central axis of rotation for the roller bearing assembly and having an outer ring width, the outer ring having a first outer ring axial face and a second outer ring axial face, an inner ring disposed radially inwardly of the outer ring and cooperating therewith to form a roller volume, the inner ring having an inner ring width that is lesser than the outer ring width, the inner ring having a first inner ring axial face and a second inner ring axial face, the inner ring having an inner circumferential surface mountable to a shaft, the inner circumferential surface of the inner ring including a base portion engageable with a surface of the shaft and at least one cutout portion opening to an outer edge of the inner circumferential surface of the inner ring, wherein a clearance is formed between a surface of the at least one cutout portion and the surface of the shaft upon mounting the inner circumferential surface of the inner ring to the shaft, and a plurality of roller bearing elements in the roller volume rollingly disposed against an inner circumferential surface of the outer ring and an outer circumferential surface of the inner ring, the roller bearing elements allowing relative rotational motion between the outer ring and the inner ring, wherein the first outer ring axial face extends axially relative to the first inner axial face along the central axis, forming an axial extension of the outer ring.

In another aspect, there is provided an inner ring cooperating with an outer ring to form a roller bearing assembly, the inner ring comprising an outer circumferential surface receiving a plurality of roller bearing elements, the plurality of roller bearing elements engageable with the outer ring upon forming of the roller bearing assembly, and an inner circumferential surface slideably mountable to a shaft upon forming of the roller bearing assembly, the inner circumferential surface including a base portion slideably engageable with a surface of the shaft upon mounting and at least one cutout portion opening to an outer edge of the inner circumferential surface, a clearance forming between a surface of the at least one cutout portion and the surface of the shaft upon mounting, wherein upon forming of the roller bearing assembly, the base portion of the circumferential surface is engageable with the shaft subsequently to the plurality of roller bearing elements engaging with the outer ring.

In a further aspect, there is provided a method for installing a roller bearing assembly on a shaft, comprising installing an outer ring inside a housing adjacent the shaft, slideably engaging a plurality of roller bearing elements on an outer circumferential surface of an inner ring with an inner circumferential surface of the outer ring, and slideably engaging an inner circumferential surface of the inner ring with a surface of the shaft subsequently to slideably engaging the plurality of roller bearing elements with the inner circumferential surface of the outer ring.

Further in accordance with the third aspect, for instance, slideably engaging the inner circumferential surface of the inner ring with the surface of the shaft further includes slideably engaging the inner circumferential surface of the inner ring with the surface of the shaft subsequently to slideably engaging at least thirty percent of a width of each of the plurality of roller bearing elements with the inner circumferential surface of the outer ring.

Further in accordance with the third aspect, for instance, slideably engaging the inner circumferential surface of the inner ring with the surface of the shaft further includes slideably engaging the inner circumferential surface of the inner ring with the surface of the shaft subsequently to slideably engaging at most seventy percent of a width of each of the plurality of roller bearing elements with the inner circumferential surface of the outer ring.

Further in accordance with the third aspect, for instance, the method further comprises abutting an axial face of the inner ring against an end portion of the shaft.

Further in accordance with the third aspect, for instance, positioning the plurality of roller bearing elements against the outer circumferential surface of the inner ring further includes installing a cage member adjacent each roller bearing element.

DESCRIPTION OF THE DRAWINGS

Reference is now made to the accompanying figures in which:

FIG. 1 is a schematic front view of a bearing assembly in accordance with a particular embodiment;

FIG. 2 is a schematic cross-section of part of the bearing assembly of FIG. 1;

FIG. 4 is a schematic cross section showing a partial assembly of the bearing assembly of FIG. 1 with frusto-conical inner ring cutouts.

DETAILED DESCRIPTION

Figure 3A:
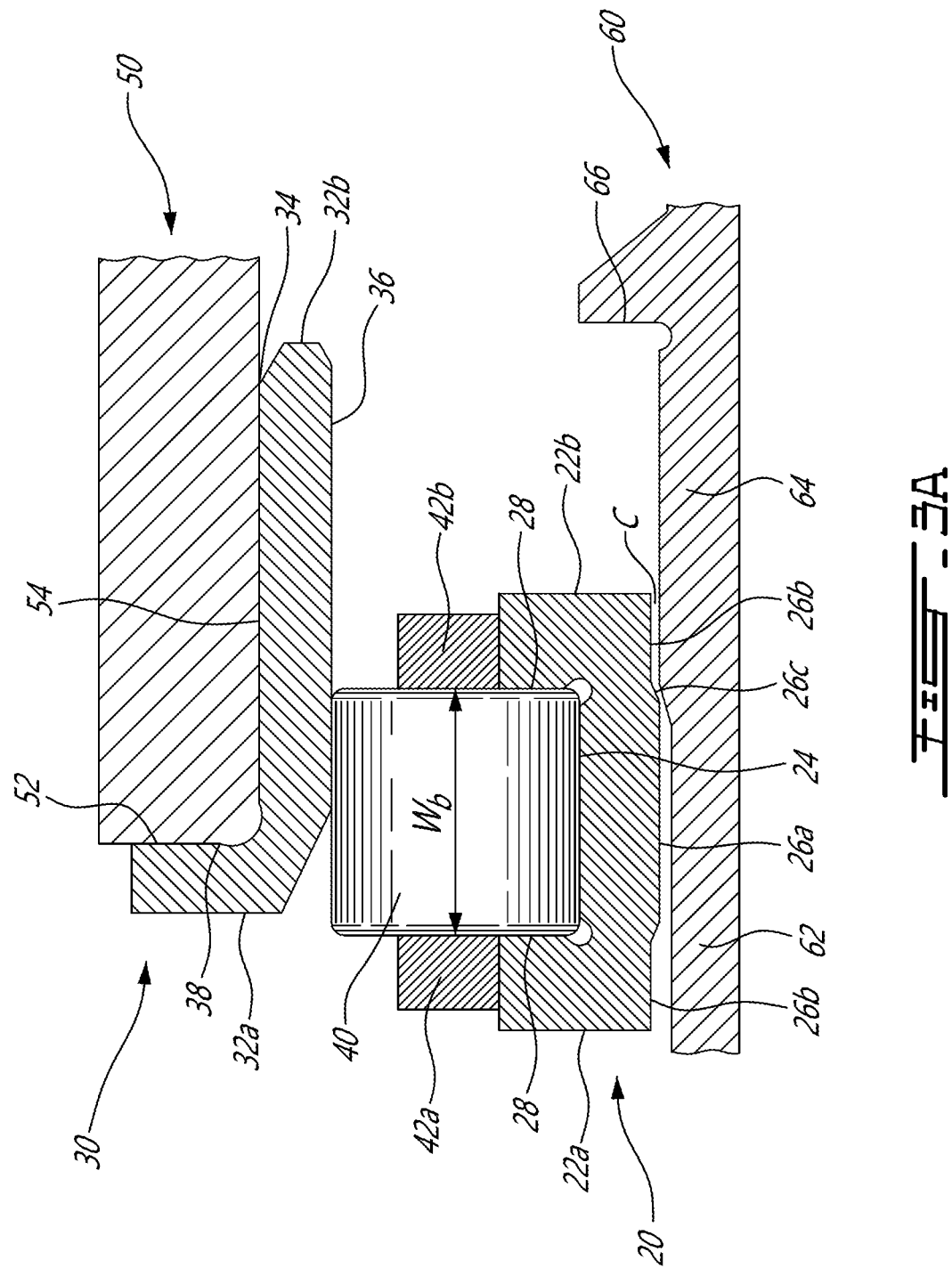
FIGS. 3A and 3B are schematic cross-sections showing, in sequence, an exemplary assembly of the bearing assembly of FIG. 1.

Referring to FIG. 1, a bearing assembly 10 in accordance with a particular embodiment is shown. In a particular embodiment, the bearing assembly 10 interfaces a shaft to a housing in a gas turbine engine. According to an embodiment, the bearing assembly 10 is a high speed roller bearing, although the present technology may be used in bearing assemblies operating at various speeds. The bearing assembly 10 generally includes concentric inner ring 20 and outer ring 30 respectively defining concurrently a roller volume including inner and outer races defined between an inner radius $R_i$ and an outer radius $R_o$ in which a plurality of bearing elements 40, also referred to as bearing rolling elements 40, retained for example by a cage member 42 are received to allow relative rotation between the inner ring 20 and outer ring 30. In the shown case, the bearing elements 40 are rollers, although in other cases other bearing elements such as for example straight rollers, needles and crowned rollers may be used. The cage member 42 is received between the inner ring 20 and the outer ring 30 and may equally space the bearing elements 40 apart such that each bearing element 40 rotates around the inner and outer races without contacting the other bearing elements 40.

Figure 3B:
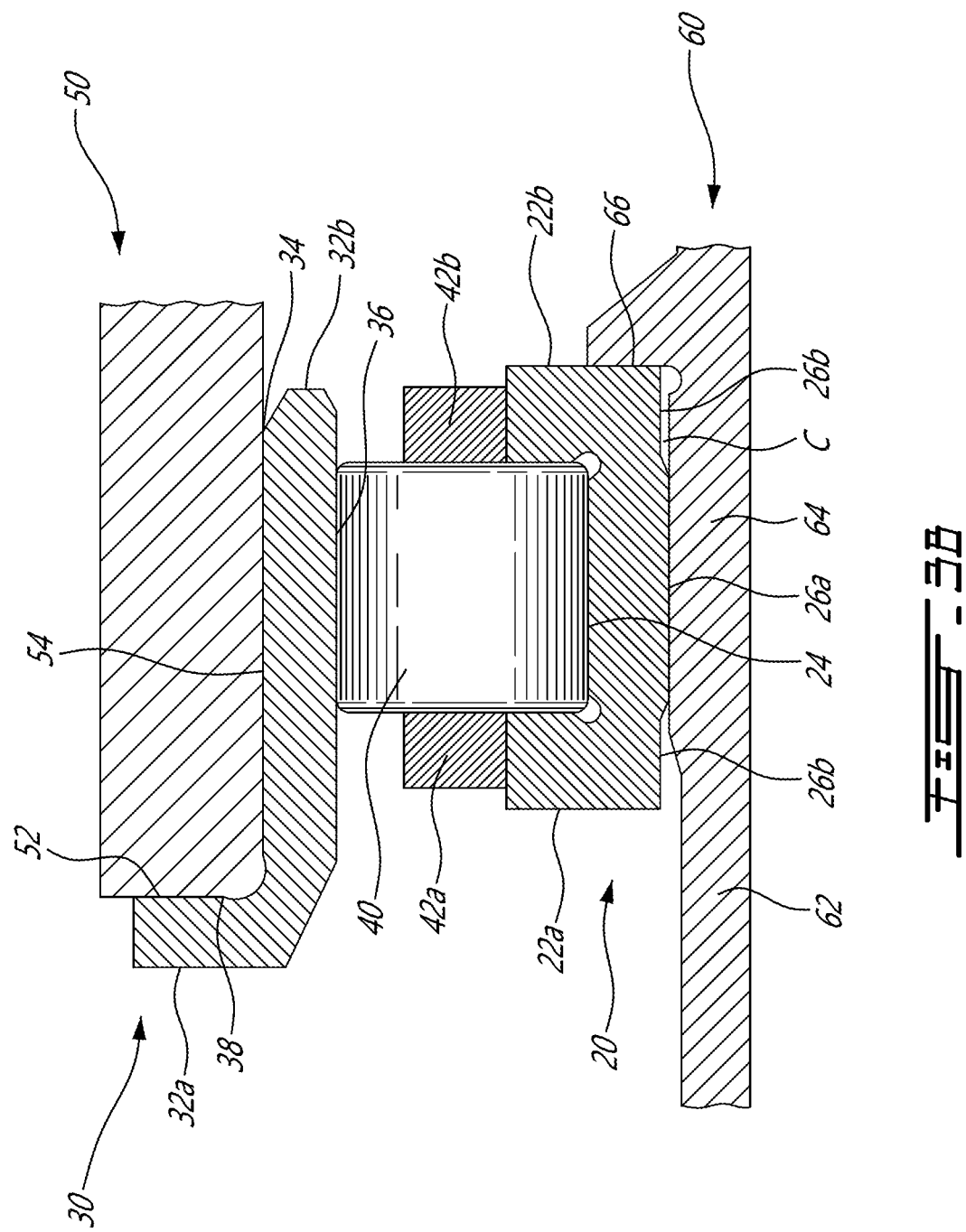

The outer ring 30 has a ring body that is centered on a central axis X of the bearing assembly 10 and defines a central axis of rotation for the bearing assembly 10, with the outer race being defined on an inner surface thereof around its circumference. For example, the outer ring 30 may define an annular torus portion to accommodate the bearing elements 40. Although not shown in FIG. 1, the inner surface may be at the same diameter as the outer race. The inner ring 20 may also be centered on the central axis X of the bearing assembly 10, with the inner race being defined on an outer surface thereof around its circumference. The bearing assembly 10 shown in FIG. 1 may be said to be in an assembled yet in an isolated or non-functioning state, as it is not shown to be installed for its intended purpose, i.e. to allow relative rotation between different components. As shown in FIGS. 3A and 3B, the bearing assembly 10 may be the interface between a housing 50 and a shaft 60, for example.

FIGS. 2, 3A and 3B show an upper half of the bearing assembly 10, in schematic view, with the lower half and lines joining the halves removed for simplicity. It is however understood that a mirror image (with some local variations possible) of what is shown in FIGS. 2, 3A and 3B would be present due to the annular shape of the bearing assembly 10. Referring to FIG. 2, the bearing assembly 10 is shown in an assembled configuration, i.e. the shown bearing element 40 is disposed between the inner ring 20 and the outer ring 30. The inner ring 20 includes a first axial face 22a and a second axial face 22b on opposing sides of the inner ring 20, defining an inner ring width $W_i$ therebetween. The inner ring 20 includes an outer circumferential surface 24 for receiving the bearing elements 40. The inner ring 20 further includes an inner circumferential surface 26 mountable to the shaft 60, as will be discussed in further detail below. The inner circumferential surface 26 may include a base portion 26a and one or more cutout portions 26b. Illustratively, the inner circumferential surface 26 includes two cutout portions 26b: a first cutout portion 26b adjacent the first axial face 22a and a second cutout portion 26b adjacent the second axial face 22b, with the base portion 26a being generally centrally located between the cutout portions 26b. The surface of the cutout portion(s) 26b is thus recessed within the inner ring 20 relative to the base portion 26a. In the shown embodiment, although not necessarily the case in all embodiments, the surface of the cutout portion(s) 26b is cylindrical, as is the surface of the base portion 26a, and they are concentric relative to one another. Other relative arrangements between these surfaces may be considered as well, for instance with the cutout portions 26b being frusto-conical, as will be discussed in further detail below. In the shown embodiment, one or more chamfered portions 26c joins the base portion 26a to the cutout portion(s) 26b. Other transitional surfaces between the base portion 26a and the cutout portion(s) 26b may be considered as well, such as surfaces of varying angles, or a right angle step. The width and depth of the cutout portion(s) 26b may vary depending upon the specific application for the bearing assembly 10, as will be discussed in further detail below. In the shown embodiment, inner sidewalls 28 border the outer circumferential surface 24 to aid in snugly receiving the bearing elements 40.

Similarly, the outer ring 30 includes a first axial face 32a and a second axial face 32b on opposing sides of the outer ring 30, defining an outer ring width $W_o$ therebetween. The outer ring 30 may further include an outer circumferential surface 34 defining the outer radius $R_o$, and an inner circumferential surface 36. The inner circumferential surface 36 is the surface against which the bearing elements 40 roll, and is shown as being substantially cylindrical, as is the outer circumferential surface 34. Surface depressions may be present in the inner circumferential surface 36 as the inner circumferential surface 36 defines an outer raceway of the bearing assembly 10. At an end of the outer ring 30, a wall 38 may be present. For example, the wall 38 is an annular wall, and may be said to form a flange. A countersink transition, i.e., a taper, may be present at the junction between the inner circumferential surface 36 and the wall 38, as shown in FIG. 2.

In the shown case, although not necessarily the case in all embodiments, a given cage member 42 includes a first or proximal portion 42a adjacent the first axial face 22a of the inner ring 20 and a second or distal portion 42b adjacent the second axial face 22B of the inner ring 20, the terms 'proximal' and 'distal' referring to the proximity of the respective lands 42a, 42b to the first axial face 22a of the inner ring 20. The proximal portion 42a and the distal portion 42b may or may not be substantially similar, as will be discussed in further detail below. The inner ring 20 further includes an outer circumferential surface 24 and an inner circumferential surface 26, as will be discussed in further detail below.

The inner ring width $W_i$ is lesser in magnitude than the outer ring width $W_o$. In other words, the inner ring 20 is narrower than the outer ring 30, with the widths being in the axial direction, i.e., a distance along the central axis X. For instance, the outer ring width $W_o$ may be at least twenty five percent greater than the inner ring width $W_i$. Other ratios between the outer ring width $W_o$ and inner ring width $W_i$ may be considered as well. In the bearing assembly's 10 assembled configuration, this difference in width may take various forms. For instance, in the bearing assembly 10 shown in FIG. 2, the second axial face 22b of the inner ring 20 and the second axial face 32b of the outer ring 30 are generally vertically aligned along the central axis X, while the first axial face 32a of the outer ring 30 extends or protrudes further from the bearing element 40 than the first axial face 22a of the inner ring 20 along the central axis X, thus creating an overhanging portion of the outer ring 30, the overhanging portion regarded as well as an axial extension. In other cases, the additional width of the outer ring 30 may be distributed on either side of the bearing assembly 10 such that there may be overhanging portions—axial extensions—at both the first axial face 32a and the second axial face 32b of the outer ring 30, relative to the inner ring 20. In some cases, these overhanging portions may have substantially equal widths. While in other cases one overhanging portion may be wider than the other. Other configurations may be considered as well.

As discussed above, cage member 42 is provided to contain and space out the bearing elements 40 within the roller volume. As shown, each cage member 42 includes a proximal portion 42a adjacent the first axial face 22a of the inner ring 20 and a distal portion 42b adjacent the second axial face 22a of the inner ring 20. As such, each bearing element 40 is flanked on either side by a respective proximal portion 42a and distal portion 42b. Other types of cage members 42 may be considered as well. Each bearing element 40 is defined by a bearing width $W_b$. In the shown case, the bearing elements 40 of the bearing assembly 10 have the same bearing width $W_b$, although bearing assemblies 10 with bearing elements 40 with varying bearing widths $W_b$ and sizes may be considered as well. This bearing width $W_b$ may be selected such that each bearing element 40 is snugly received by the cavity defined by the outer circumferential surface 24 and the inner sidewalls 28 of the inner ring 20, or like raceway. The bearing width $W_b$ may also vary depending on the style and dimensions of the selected cage member 42.

Referring to FIG. 3A-3B, an exemplary process for assembling the bearing assembly 10 is shown. The following steps are exemplary in nature and may be modified without departing from the scope of the present technology. As shown in FIG. 3A, the outer ring 30 is first installed on the housing 50 adjacent the shaft 60. The bearing assembly 10 may be thus used to allow relative rotation between the housing 50 and the shaft 60. In some cases, the housing 50 and shaft 60 may be components of a gas turbine engine, shown via the housing 50 and the shaft 60. The housing 50 may be an element of a larger component (not shown) adjacent to the shaft 60 and operable to rotate relative to the shaft 60, though the housing 50 may be generally static with the shaft 60 rotating relative to the housing 50. The housing 50 and the shaft 60 may be concentric about central axis X (FIG. 1) with a gap formed between them generally corresponding to an overall thickness of the bearing assembly 10, the thickness defined by a difference between the bearing assembly's 10 outer radius $R_o$ and inner radius $R_i$. The housing 50 may include an end surface 52 against which may abut the inner wall 38 of the outer ring 30, and a contact surface 54 which makes contact with the outer circumferential surface 34 of the outer ring 30. The shaft 60 may include a first section 62 a second section 64, the second section 64 having a greater radius than the first section 62, as will be discussed in further detail below. As such, the first section 62 may be referred to as a thinner section of the shaft 60 and the second section 64 may be referred to as a thicker section of the shaft 60. The second section 64 may also be referred to as a 'shaft spigot' or a 'tighter-fitting area'. The shaft 60 may further include an end portion 66, also referred to as a shaft shoulder, for abutting the second axial face 22b of the inner ring 20 after it is slideably mounted to the shaft 60, as will be discussed in further detail below.

After the outer ring 30 is installed on the housing 50, the plurality of roller bearing elements 40 are positioned against the outer circumferential surface 24 of the inner ring 20. Illustratively, as discussed above, each roller bearing element 40 is positioned between a respective proximal portion 42a and distal portion 42b and is snugly received between inner sidewalls 28, if present.

Once the roller bearing elements 40 are received to or mounted on the inner ring 20, the assembled inner ring 20 and roller bearing elements 40 are slid between the outer ring 30 and the shaft 60 so that the roller bearing elements 40 slideably engage the inner circumferential surface 36 of the outer ring 30. As shown in FIG. 3A, due to the extended bearing width $W_o$ of the outer ring 30, along with the cutout portion(s) 26b of the inner circumferential surface 26 of the inner ring 20, the roller bearing elements 40 slideably engage the inner circumferential surface 36 of the outer ring 30 before the inner circumferential surface 26 of the inner ring 20 makes contact with the second section 64 of the shaft 60, thus facilitating assembly and minimizing the risk of scratching or other damage to, for instance, the roller bearing elements 40. As will be discussed in further detail below, the two aforementioned features of the bearing assembly 10 (the extended bearing width $W_o$ of the outer ring 30 and the cutout portion(s) 26b in the inner circumferential surface 26 of the inner ring 20) may be implemented together, as in the shown embodiment, or independently to minimize the risk of scratching or other damage to the various components. Stated differently, the axial offset between the overhanging or axially extending portion of the outer ring 30 and the second section 64 of the shaft 60 result in a two-phase positioning of the assembled inner ring 20 and roller bearing elements 40. In a first phase, the assembled inner ring 20 and roller bearing elements 40 are fitted into the outer ring 30, with no pressure from the first section 62 of the shaft 60 onto the assembled inner ring 20 and roller bearing elements 40. In a second phase, once contacting the outer ring 30, assembled inner ring 20 and roller bearing elements 40 are fitted onto the second section 64 of the shaft 60.

As discussed above, the inner circumferential surface 24 of the inner ring 20 is slideably engaged with an outer surface of the shaft 60 subsequently to the roller bearing elements 40 slideably engaging the inner circumferential surface 36 of the outer ring 30. In some cases, at least thirty percent of the bearing width $W_b$ of the roller bearing elements 40 slideably engages the inner circumferential surface 36 of the outer ring 30 before the inner circumferential surface 24 of the inner ring 20 slideably engages the outer surface of the shaft 60. In other cases, at most seventy percent of the bearing width $W_b$ of the roller bearing elements 40 slideably engages with the inner circumferential surface 36 of the outer ring 30 before the inner circumferential surface 24 of the inner ring 20 slideably engages with the outer surface of the shaft 60. Other ranges for the percentage of engagement between the roller bearing elements 40 and the inner circumferential surface 36 of the outer ring 30 before the inner circumferential surface 24 of the inner ring 20 slideably engages with the outer surface of the shaft 60 may be considered as well. Such percentage of engagement may depend, for example, on the relative widths of the outer ring 30 versus the inner ring 20. The length and/or depth of the cutout portion(s) 26b may also affect such percentage of engagement, as will be discussed in further detail below. In the case shown in FIG. 3A, approximately fifty percent of the bearing width $W_b$ of the roller bearing elements 40 are slideably engaged with the inner circumferential surface 36 of the outer ring 30 as the inner circumferential surface 24 of the inner ring 20 is nearing the point of slideably engaging with the outer surface of the second section 64 of the shaft 60.

As the roller bearing elements 40 slideably engage the inner circumferential surface 36 of the outer ring 30, a clearance or gap C is formed and maintained between the surface of the cutout portion 26b and the surface of the shaft 60, illustratively shown in FIG. 3B. As such, the inner ring 20 only makes sliding contact (i.e., excluding incidental contact from radial movement when the gap is present) with the shaft 60 once the roller bearing elements 40 engage sufficiently with the inner circumferential surface 36 of the outer ring 30, at which point the base portion 26a of the inner circumferential surface 26 of the inner ring 20 slidingly engages with the surface of the shaft 60. In some cases, such engagement of the roller bearing elements 40 with the inner circumferential surface 36 of the outer ring 30 is represented by between thirty and seventy percent of the bearing width $W_b$. In the shown embodiment, the chamfered portion 26c provides a smooth engagement between the base portion 26a and the surface of the shaft 60.

In the present case, although not necessarily the case in all cases, the shaft 60 includes different sections of varying diameters, illustratively a thinner first section 62 and a thicker second section 64. The width $W_o$ of the outer ring 30 and/or the cutout portion(s) 26b may thus be dimensioned so that the base portion 26a only engages the shaft 60 at the thicker second portion 64, reducing a risk of scratching or other potential damage as the roller bearing elements 40 engage with the inner circumferential surface 36 of the outer ring 30. As shown in FIG. 3B, the second axial face 22b may abut the end portion 66 once the inner ring 20 has slideably engaged with the shaft 60 until this end portion 66 has been reached. At such a point, the bearing assembly 10 is snugly received between the housing 50 and the shaft 60. The outer circumferential surface 34 of the outer ring 30 contacts the contact surface 54 of the housing 50, the base portion 26a of the inner circumferential surface 26 of the inner ring 20 contacts the surface of the shaft 60 (illustratively at the thicker second section 64), the inner wall 38 of the outer ring 30 abuts the end surface 52 of the housing 50, and the second axial face 22b of the inner ring 20 abuts the end portion 66 of the shaft 60, creating this overall snug fit, which may also be an interference fit or a force fit.

In the shown embodiment, the two cutout portions 26b straddle the base portion 26a, and two chamfered portions 26c (or other transition surfaces) are provided for transitioning between the base portion 26a and the respective cutout portions 26b. The shown inner ring 20 is thus symmetrically-shaped, though this is an option only. As such, once the outer ring 30 is installed on the housing 50, the inner ring 20 may slidingly engage the surface of the shaft 60 from either direction, i.e. with the first axial face 22a leading or with the second axial face 22b leading. In such an embodiment, the proximal portion 42a and distal portion 42b may be substantially similar as well to maintain consistent functionality of the bearing assembly 10 regardless of the chosen leading direction. Such bi-directional capability may facilitate its installation for a user, as the inner ring 10 may be installed with either direction leading. In other cases, the inner circumferential surface 26 of the inner ring 20 may include only one cutout portion 26b, for instance in cases where a given bearing assembly 10 requires a specific direction of installation. In such a case, the inner ring 10 is to be installed with the side having the cutout portion 26b leading. Alternatively, the inner circumferential surface 26 of the inner ring 20 may include two cutout portions 26b that are dimensioned differently, i.e. an inner ring 20 with an asymmetrically-shaped inner circumferential surface 26. For instance, the widths or depths of each cutout portion 26b may differ from the other. In such cases, a single bearing assembly 10 may be used for different applications, for instance for in cases requiring longer durations of time between the engagement between the bearing elements 40 and the inner circumferential surface 36 of the outer bearing 30 and between the base portion 26a and the surface of the shaft 60. In such cases, the direction of installation of the inner ring 20 would be chosen based on the specific application.

As discussed above, while the shown bearing assembly 10 includes both an outer ring having 30 having an extended bearing width $W_o$ and an inner ring 20 with cutout portion(s) 26b in its inner circumferential surface 26 to minimize the risk of scratching or other damage to the various components, in various cases each of these features may be implemented independently. For instance, a bearing assembly 10 may be provided with a suitably wide outer ring 30 (relative to the inner ring 20) such that, upon assembly, the roller bearing elements 40 engage the inner circumferential surface 36 of the outer ring 30 before the inner circumferential surface 26 of the inner ring 20 (in such cases having no cutouts 26b) engages the surface of the shaft 60. In such cases, a ratio between the outer ring width $W_o$ and the inner ring width $W_i$ would influence the percentage of engagement between the roller bearing elements 40 and the inner circumferential surface 36 of the outer ring 30. Alternatively, in some cases a bearing assembly 10 may be dimensioned so that the outer ring width $W_o$ is similar in magnitude to the inner ring width $W_i$, while the inner ring 20 contains cutout portion(s) 26b that are sufficiently wide to ensure that the roller bearing elements 40 engage the inner circumferential surface 36 of the outer ring 30 before the base portion 26a of the outer circumferential surface 24 of the inner ring 20 engages the surface of the shaft 60.

In the shown embodiment, both of the two aforementioned features (an outer ring 30 having an extended bearing width $W_o$ and an inner ring 20 with cutout portion(s) 26b in its inner circumferential surface 26) are implemented to minimize the risk of scratching or other damage to the various components of the bearing assembly 10. The combination of these two features negates the need for an overly wide outer ring 30, as the two features cooperate to achieve the desired percentage of engagement between the roller bearing elements 40 and the inner circumferential surface 36 of the outer ring 30 before the inner circumferential surface 26 of the inner ring 20 engages the surface of the shaft 60, yielding an overall shorter bearing assembly 60.

As such, according to various embodiments of the present technology, a roller bearing assembly 10 includes at least one feature operable to ensure that, upon assembly with a housing 50 and a shaft 60, roller bearing elements 40 pre-installed in the inner ring 20 first engage with the outer ring 30 (already mated to the housing 50) before the inner ring 20 engages with the shaft 60. Such feature may be the outer ring 30 having an extended bearing width $W_o$ and/or the inner ring 20 having one or more cutout portions 26b at one or more edges thereof to provide additional clearance between the inner ring 20 and the shaft 60.

Referring now to FIG. 4, as discussed above, in some cases the cutout(s) 26b may be frusto-conically shaped. Illustratively, two like cutouts 26b are each frusto-conically shaped. In other words, the cutout(s) 26b are chamfered portions of the inner circumferential surface 26 of the inner ring 20 along outer edges thereof. Taken as a cross-section, as in FIG. 4, each cut-out 26b resembles an angled surface joining the base portion 26a to a respective axial face 22a, 22b. In some cases, to ensure the bearing assembly 10 is properly seated on the shaft 60 upon mounting, the height of the cutout(s) 26b along a respective axial face 22a, 22b should not exceed the height of the end portion 66 of the shaft 60. In some cases, the angle of the cut-out(s) 26b with respect to the base portion 26a is approximately 10 to 20 degrees to ensure a sufficient clearance C with the surface of the shaft 60, although other angles may be considered as well. In some cases, the width of each cutout 26b should not exceed a third of the width of the entire inner circumferential surface 26 of the inner ring 20 to ensure that the surface area of the base portion 26a is great enough for a tightly fitted connection between the inner ring 20 and the shaft 60. Other relative widths for the cutout(s) 26b may be considered as well. In various cases, different numbers and types of inner ring cutouts 26b may be considered, for instance an inner ring 20 with a single frusto-conical cutout 26b or an inner ring 20 with a cylindrical cutout 26b adjacent the first axial face 22a and a frusto-conical cutout 26b adjacent the second axial face 22b.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A roller bearing assembly comprising:
   an outer ring defining a central axis of rotation for the roller bearing assembly and having an outer ring width, the outer ring having a first outer ring axial face and a second outer ring axial face;
   an inner ring disposed radially inwardly of the outer ring and cooperating therewith to form a roller volume, the inner ring having an inner ring width that is less than the outer ring width, the inner ring having a first inner ring axial face and a second inner ring axial face, the inner ring having an inner circumferential surface mountable to a shaft, the inner circumferential surface of the inner ring including a base portion engageable with a surface of the shaft and at least one cutout portion opening to an outer edge of the inner circumferential surface of the inner ring, wherein a clearance is formed between a surface of the at least one cutout portion and the surface of the shaft upon mounting the inner circumferential surface of the inner ring to the shaft; and
   a plurality of roller bearing elements in the roller volume rollingly disposed against an inner circumferential surface of the outer ring and an outer circumferential surface of the inner ring, the roller bearing elements allowing relative rotational motion between the outer ring and the inner ring;
   wherein the first outer ring axial face extends axially relative to the first inner ring axial face along the central axis, forming an axial extension of the outer ring, and
   wherein the base portion of the inner circumferential surface of the inner ring has a width along the central axis substantially equal to a width of the plurality of roller bearing elements.

2. The roller bearing assembly as defined in claim 1, wherein the second outer ring axial face is vertically aligned with the second inner ring axial face along the central axis.

3. The roller bearing assembly as defined in claim 1, wherein, in an unassembled configuration, the outer ring is installable on a housing adjacent the shaft before cooperating with the inner ring to form the roller volume.

4. The roller bearing assembly as defined in claim 3, wherein, upon mounting the inner circumferential surface of the inner ring to the shaft, at least thirty percent of a width of each of the plurality of roller bearing elements is slideably engageable with the inner circumferential surface of the outer ring before the base portion of the inner ring engages the surface of the shaft.

5. The roller bearing assembly as defined in claim 3, wherein, upon mounting the inner circumferential surface of the inner ring to the shaft, at most seventy percent of a width of each of the plurality of roller bearing elements is slideably engageable with the inner circumferential surface of the outer ring before the base portion of the inner ring engages the surface of the shaft.

6. The roller bearing assembly as defined in claim 1, wherein the surface of the at least one cutout portion is cylindrical, wherein a surface of the base portion of the inner circumferential surface of the inner ring is cylindrical, and wherein the surface of the at least one cutout portion and the surface of the base portion are concentric relative to one another.

7. The roller bearing assembly as defined in claim 1, wherein the at least one cutout portion and the base portion of the inner circumferential surface of the inner ring are joined by a chamfered portion.

8. The roller bearing assembly as defined in claim 1, wherein the inner circumferential surface of the inner ring includes two cutout portions, a first of the two cutout portions adjacent the first inner ring axial face and a second of the two cutout portions adjacent the second inner ring axial face.

9. The roller bearing assembly as defined in claim 8, wherein the two cutout portions includes shapes that are substantially the same.

10. The roller bearing assembly as defined in claim 1, wherein the at least one cutout portion is frustoconically-shaped.

11. The roller bearing assembly as defined in claim 1, wherein the inner ring further includes a pair of inner sidewalls bordering the outer circumferential surface of the inner ring to snugly receive the plurality of roller bearing elements therebetween.

12. The roller bearing assembly as defined in claim 1, wherein the outer ring width is at least twenty five percent greater than the inner ring width.

13. An inner ring for a roller bearing assembly, the inner ring operable to be mounted to a shaft and form a roller volume with an outer ring disposed radially outwardly of the inner ring to house a plurality of roller bearing elements, the inner ring comprising:
    an outer circumferential surface comprising a raceway receiving the plurality of roller bearing elements, the plurality of roller bearing elements engageable with the outer ring upon forming of the roller bearing assembly; and
    an inner circumferential surface slideably mountable to the shaft upon forming of the roller bearing assembly, the inner circumferential surface including a base portion slideably engageable with a surface of the shaft upon mounting and at least one cutout portion opening to an outer edge of the inner circumferential surface, a clearance forming between a surface of the at least one cutout portion and the surface of the shaft upon mounting;
    wherein upon forming of the roller bearing assembly, the base portion of the inner circumferential surface is engageable with the shaft subsequently to the plurality of roller bearing elements engaging with the outer ring; and
    wherein the base portion of the inner circumferential surface has a width relative to a central axis of the roller bearing assembly substantially equal to a width of the race way of the outer circumferential surface.

14. The inner ring as defined in claim 13, wherein the surface of the at least one cutout portion is cylindrical and a surface of the base portion is cylindrical, and the surface of the at least one cutout portion and the surface of the base portion are concentric relative to one another.

15. The inner ring as defined in claim 14, wherein upon mounting the inner circumferential surface to the shaft and engaging the base portion with the surface of the shaft, the surface of the base portion, the surface of the at least one cutout portion and the surface of the shaft are concentric relative to one another.

16. The inner ring as defined in claim 13, wherein the at least one cutout portion and the base portion of the inner circumferential surface are joined by a chamfered portion.

17. The inner ring as defined in claim 13, wherein the at least one cutout portion is frustoconically-shaped.

18. The inner ring as defined in claim 13, wherein the inner circumferential surface includes two cutout portions, a first of the two cutout portions adjacent a first axial face of the inner ring and a second of the two cutout portions adjacent a second axial face of the inner ring.

19. The inner ring as defined in claim 13, wherein, upon mounting the inner circumferential surface of the inner ring to the shaft, an axial face of the inner ring abuts against an end portion of the shaft.

\* \* \* \* \*